Aug. 16, 1966 H. F. WELSH 3,266,691
V-SHAPED VACUUM LOOP BOXES
Filed March 23, 1964
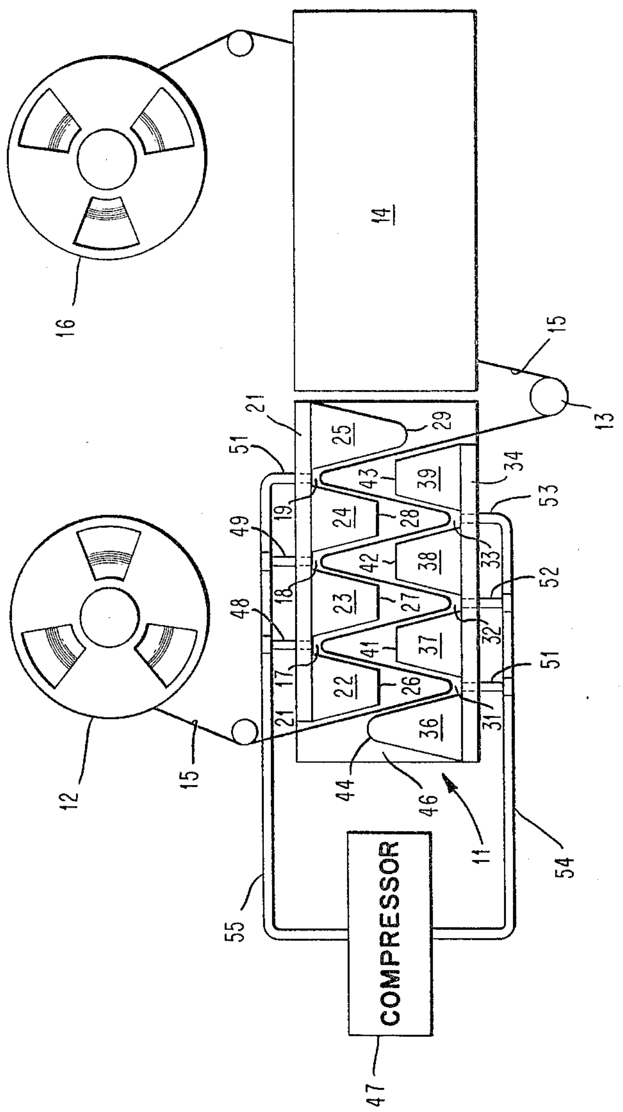

United States Patent Office 3,266,691

Patented August 16, 1966

3,266,691

V-SHAPED VACUUM LOOP BOXES

Herbert Frazer Welsh, deceased, late of Philadelphia, Pa., by Julea S. Chapline, executrix, Philadelphia, Pa., assignor to Sperry Rand Corporation, New York, N.Y., a corporation of Delaware Filed Mar. 23, 1964, Ser. No. 355,528
10 Claims. (Cl. 226—97)

This invention relates to vacuum loop box arrangement and more particularly to a vacuum loop box arrangement comprising a plurality of V-shaped vacuum loop boxes.

The use of vacuum loop boxes in tape handling systems is well known. Typically a vacuum loop box is disposed between a tape reel and the tape drive capstan as a tape storage buffer to accommodate the slow acceleration of the supply or take-up reel to the rapid acceleration of the tape drive capstan. Due to the high acceleration capability of the tape drive capstan and the relatively low acceleration capability of the take-up or supply reels vacuum loop boxes providing buffer loops of tape between the reels and capstan are used to prevent undue tensioning or breakage of the tape which might occur when the tape transport system is started or stopped. In other words, because the high acceleration and deceleration rates of the low mass tape drive capstan are not compatable with those of the high mass supply and take-up reels, slack loops of tape are interposed therebetween to serve as tape reservoirs during the time required for the supply and take-up reels to come to a equilibrium speed.

Vacuum loop boxes used today in conjunction with tape handling systems are of the small up-right type requiring numerous idler pulleys and other mechanisms for positioning the tape in loop form within the vacuum loop box. The combined effect of a relatively small vacuum loop box and positioning pulley means increases the torque requirement of the tape drive capstan from what it would otherwise be.

Heretofore, no tape handling system has been available which substantially eliminates pulleys and other tape positioning mechaninms. The present invention contemplates a particularly structured vacuum loop box arrangement which eliminates the need for positioning pulleys or other tape positioning mechanisms and thereby substantially reduces the power requirement of the tape drive capstan.

The present invention contemplates a tape transport system wherein slack loops of tape are provided between tape reels and the tape drive capstan by means of a first plurality of adjacent V-shaped vacuum loop boxes cut or otherwise formed in a first solid member and a second plurality of adjacent V-shaped vacuum loop boxes cut or otherwise formed in a second solid member. The V-shaped boxes open and have their widest dimension at a flat surface of said first and second solid members. The flat surfaces of said first and second solid members interspace each vacuum loop box opening and have a somewhat smalled width than each of the vacuum loop box openings. The two solid members are rigidly fixed relatively to each other in such a manner that their respective flat surfaces are parallel and so spaced that a length of tape may easily be inserted edgewise therebetween. Further, each loop box of a member is disposed opposite a flat portion between loop box openings on the other member. Pump or other evacuating means which communicate with each of the loop boxes draw fluid such as air therethrough in a direction from the large dimension to the smaller dimension of the V-shaped loop boxes. Thus, when tape is placed between the first and second members, it form loops within each of the vacuum loop boxes which are held therein by the evacuating action of the pump means.

Therefore, it is an object of the present invention to provide a vacuum loop box arrangement which permits greater speed of operation and requires less power to the tape drive system.

Another object of the present invention is to provide a vacuum loop box system wherein a length of slack tape may be provided between tape reel and the tape drive capstan without the need for moving parts which permits of greatly increased tape speed without an increase of power to the tape drive system.

Another object of the present invention is to provide a vacuum loop box arrangement which may be easily threaded and which substantially reduces the number of tape positioning devices with their attendant power consumption.

Yet another object of the present invention is to provide a vacuum loop box arrangement which comprises a plurality of vacuum loop boxes wherein the length of tape disposed in each box is maintained equal.

Other objects and many of the attendant advantages of the present invention will become more apparent upon reading of the specification with reference to the drawings wherein the figure illustrates a preferred embodiment of the present invention.

The figure illustrates the present invention in its environment with a conventional tape transport system. A vacuum loop box arrangement 11 is disposed between tape supply reel 12 and tape drive capstan 13. Another vacuum loop box arrangement 14 is disposed between take-up reel 16 and the tape drive capstan 13. Since vacuum loop box arrangement 14 is identical in construction to vacuum loop box 11, it is not shown in detail.

The vacuum loop box arrangement 11 comprises V-shaped vacuum loop boxes 17, 18 and 19 cut or otherwise formed in a solid member 21. Solid member 21 comprises tapered elements 22, 23, 24 and 25 which define the boundaries of vacuum loop boxes 17, 18 and 19 as best seen in the figure. Tapered elements 22, 23, and 24 are formed with flat portions 26, 27, and 28, respectively, while tapered element 25 has a rounded portion 29.

A second group of V-shaped vacuum loop boxes 31, 32 and 33 are formed in solid member 34. Like solid member 21, solid member 34 comprises tapered elements 36, 37, 38 and 39. Each of the tapered elements 37, 38 and 39 has a flat portion 41, 42 and 43, respectively, while tapered element 36 has a rounded portion 44. Needless to say each vacuum loop box arrangement may comprise more or less vacuum loop boxes. Members 21 and 34 are disposed with respect to each other such that flat portions 26, 27 and 28 of tapered elements 22, 23 and 24 are opposite the openings of V-shaped vacuum loop boxes 31, 32, 33, respectively.

Likewise, the flat portions 41, 42 and 43 of tapered elements 37, 38 and 39 are opposite the openings of V-shaped vacuum loop boxes 17, 18, and 19. Each of the flat portions 26, 27 and 28, 41, 42, and 43 have a somewhat smaller dimension than the maximum dimension of the V-shaped vacuum loop boxes. Furthermore, elements 21 and 34 are so spaced from one another that recording tape may be easily threaded therebetween. A back plate 46 and with which elements 21 and 34 may be integral, maintains the spacial relationship between the members 21 and 34 and also may be used for mounting vacuum loop box arrangement 11 on the tape transport system. Alternatively, members 21 and 34 may be individually rigidly mounted on the tape transport system.

Each of vacuum loop boxes 17, 18, 19, 31, 32 and 33 communicate with vacuum pump 47 commonly connected to orifices 48, 49, 50, 51, 52, and 53, as by means of pipes 54 and 55 interconnecting vacuum pump 47 and the vacuum loop boxes as shown in the figure.

Vacuum pump 47 provides a constant source of pressure or vacuum to each of the loop boxes in each of the member 21 and 34. Since the sides of the vacuum loop boxes are sloped in the shape of a V, the cross sectional area of the tape varies as a function of the length of loop within each vacuum loop box. Thus, at the smallest part of the V of a vacuum loop box the tape area is smallest and at the widest part of the V the tape area is greatest. After the tape is threaded into the vacuum loop box arrangement 11 and deformed into a loop in each one of the vacuum loop boxes, the force applied on the tape is equal to the pressure times the total tape cross sectional area exposed in all of the vacuum loop boxes. Since the pressure supplied by vacuum pump 47 is constant, the total cross sectional area exposed in the vacuum loop boxes determines the holding force applied on tape. Thus, if initially one section of the tape conformed to the V of say vacuum loop box 17 and another section of the tape was straight across the top of the V of say vacuum loop box 31, the two sections would be forced to equalize their respective lengths in vacuum loop boxes 17 and 31 until the force on each was equal. Due to this arrangement the lengths of tape within each of the vacuum loop boxes of vacuum loop box arrangement 11 are caused to assume equilibrium positions of equal lengths. In other words the length of the tape evens out and assumes an equilibrium position within each vacuum loop box. As supply reel 12 provides tape to tape drive capstan 13, vacuum loop box arrangement 11 maintains a length of the tape in a slack condition to compensate for differences in acceleration and deceleration between tape supply reel 12 and tape drive capstan 13. Similarly, vacuum loop box arrangement 14 maintains tape in a slack condition between tape drive capstan 13 and take-up reel 16. Due to the unique construction of the vacuum loop box arrangement 11 substantially all of the speed reducing components, for example, pulleys, etc., are eliminated and therefore speed capability is substantially increased without increasing the drive power of tape drive capstan 13.

In the above described system the tape in every other loop box will be rubbed by one of the walls thereof on its recorded side. In order to overcome this disadvantage each of the loop boxes may be arranged in side by side relationship as well as the above discussed face to face relationship. In other words, each vacuum loop box may be displaced from the other vacuum loop boxes in a direction perpendicular to the drawing sheet and at a distance slightly greater than the width of the tape. Furthermore, each of the loop boxes may be slightly twisted so that the same surface of the tape faces each loop box. Thus, the tape would form a spiral within the vacuum loop box arrangement as it proceeds therethrough between reel and capstan.

Obviously various other modifications of the present invention are possible in light of the above specification without departing from the spirit and scope of the invention as set forth in the appended claims.

The embodiments of the invention in which an exclusive property or privilege is claimed are defined as follows:

1. A tape transport system comprising first and second groups of V-shaped vacuum loop boxes, each of said loop boxes in said first group having its tape receiving opening facing a first direction, each of said loop boxes in said second group having its tape receiving opening facing a direction opposite to said first direction, said first and second loop boxes forming a space therebetween to permit the insertion of tape therebetween, means for driving the tape, means for applying a pressure differential to the tape through each of said vacuum loop boxes whereby the tape moves into and out of each of said vacuum loop boxes during the moving of said tape.

2. A tape transport system comprising first and second groups of vacuum loop boxes, each of said vacuum loop boxes having tapered sides, each of said loop boxes in said first group having its tape receiving opening facing a first direction, each of said loop boxes in said second group having its tape receiving opening facing a direction opposite to said first direction, said first and second loop boxes forming a space therebetween to permit the insertion of tape therebetween, means for driving the tape, means for applying a pressure differential to the tape through each of said vacuum loop boxes whereby the tape moves into and out of each of said vacuum loop boxes during the moving of said tape.

3. A first group of tapered elements, each of said first group of elements being adjacent to each other to form first V-shaped areas therebetween, a second group of tapered elements, each of said second group of elements being adjacent to each other to form second V-shaped areas therebetween, said first group of tapered elements being oppositely disposed and spaced from said second group of tapered elements such that the tapered elements of said first group face the V-shaped areas of said second group to permit a strip of tape to be inserted between said first and second group of tapered elements into each of said V-shaped areas, means for supplying each of said V-shaped areas with negative pressure.

4. A first group of tapered elements, each of said first group of elements having relatively flat portions, each of said first group of elements being adjacent to each other to form first V-shaped areas therebetween, a second group of tapered elements, each of said second group of elements having relatively flat portions, each of said second group of elements being adjacent to each other to form second V-shaped areas therebetween, each of said first V-shaped areas being oppositely disposed from a respective one of said flat portions of said second group of elements and each of said second V-shaped areas being oppositely disposed from a respective one of said flat portions of said first group of elements, said flat portions of said first and second groups of elements being less in width than the maximum width of said V-shaped areas, said flat portions of said first group of elements being in a parallel spaced relationship with respect to said second group of element, a source of vacuum, means connecting said source of vacuum to each of said V-shaped areas.

5. A first group of tapered elements, each of said first group of elements having relatively flat portions, each of said first group of elements being adjacent to each other to form first V-shaped areas therebetween, a second group of tapered elements, each of said second group of elements having relatively flat portions, each of said second group of elements being adjacent to each other to form second V-shaped areas therebetween, fluid source means, means connecting said fluid source to said first and second V-shaped areas drawing fluid through said V-shaped areas in a direction from the widest dimension to the smallest dimension of said V-shaped areas, each of said first V-shaped areas being oppositely disposed from a respective one of said flat portions of said second group of elements and each of said second V-shaped areas being oppositely disposed from a respective one of said flat portions of said first group of elements, said flat portions of said first and second groups of elements being less in width than the maximum width of said V-shaped areas, said flat portions of said first group of elements being in a parallel spaced relationship with respect to said second group of elements whereby tape inserted between said first and second group of elements is deformed into loops within each of said V-shaped areas.

6. In a tape transport system, a vacuum loop box arrangement comprising; a first group of at least two tapered elements, each of said elements having relatively flat portions, each of said first group of elements being adjacent to each other to form a first V-shaped area therebetween, a second group of at least two tapered elements.

each of said elements having relatively flat portions, each of said second group of elements being adjacent to each other to form a second V-shaped area therebetween, means for connecting a fluid source to said first and second V-shaped areas, one of said flat portions of said first group of elements being oppositely spaced from said second V-shaped area and one of said flat portions of said second group of elements being oppositely disposed and spaced from said first V-shaped area, said flat portions of each of said first and second groups of elements being less in width than the maximum width of each of said first and second V-shaped areas, said flat portions of said first group of elements being in parallel spaced relationship with respect to said flat portions of said second group of elements.

7. A first member comprising; a first plurality of adjacent tapered elements forming a first plurality of V-shaped areas interspaced between adjacent ones of said first plurality of tapered elements, each of said first plurality of tapered elements terminating in a flat surface of said first member, each of said first plurality of V-shaped areas having its maximum dimension at said flat surface, a second member comprising a second plurality of adjacent tapered elements forming a second plurality of V-shaped areas interspaced between adjacent ones of said second plurality of tapered elements, each of said second plurality of tapered elements terminating in a flat surface of said second member; each of said V-shaped areas having its maximum dimension at said flat surface, said flat portions of each of said tapered elements being less in width than the maximum width of each of said V-shaped areas, means connected to said first and second members maintaining said flat surfaces in spaced parallel relationship such that each of the flat portions of each of said tapered elements is directly opposite a respective one of said V-shaped areas, a source of vacuum, means connecting said source of vacuum to each of said V-shaped areas.

8. A first member comprising; a first plurality of adjacent tapered elements forming a first plurality of V-shaped areas interspaced between adjacent ones of said first plurality of tapered elements, each of said first plurality of tapered elements terminating in a flat surface of said first member, each of said first plurality of V-shaped areas having its maximum dimension at said flat surface, a second member comprising a second plurality of adjacent tapered elements forming a second plurality of V-shaped areas interspaced between adjacent ones of said second plurality of tapered elements, each of said second plurality of tapered elements terminating in a flat surface of said second member; each of said V-shaped areas having its maximum dimension at said flat surface, said flat portions of each of said tapered elements being less in width than the maximum width of each of said V-shaped areas, first means connected to said first and second members maintaining said flat surfaces in spaced parallel relationship such that each of the flat portions of each of said tapered elements is directly opposite a respective one of said V-shaped areas, second means communicating with each of said V-shaped areas drawing fluid therethrough in a direction from the widest dimension to the smallest dimension of said V-shaped areas.

9. A first member comprising; at least two tapered elements forming a first V-shaped area therebetween, each of said tapered elements of said first member terminating in a flat surface of said first member, said first V-shaped area having its maximum dimension at said flat surface, a second member comprising at least two tapered elements forming a second V-shaped area therebetween each of said tapered elements of said second member terminating in a flat surface of said second member, each of said V-shaped areas having its maximum dimension at said flat surface of said first and second members, the flat portions of each of said tapered elements being less in width than the maximum width of each of said V-shaped areas, first means connected to said first and second members maintaining said flat surfaces in spaced parallel relationship such that the flat portion of one of said tapered elements of said first member is directly opposite said second V-shaped area, second means communicating with each of said V-shaped areas drawing fluid at constant pressure therethrough in a direction from the widest dimension to the smallest dimension of said V-shaped areas whereby a length of tape inserted between said first and second members is caused to deform into loops of equal length within each of said V-shaped areas.

10. In a tape transport system having a take-up, a supply reel, and a tape drive capstan; a vacuum loop box arrangement disposed between said take-up reel and said tape drive capstan and between said storage reel and said tape drive capstan, each of said vacuum loop box arrangements comprising: a first member comprising a first plurality of tapered elements forming a first plurality of V-shaped areas interspaced between adjacent ones of said first plurality of tapered elements, each of said first plurality of tapered elements terminating in a flat surface of said first member, each of said first plurality of V-shaped areas having its maximum dimension at said flat surface; a second member comprising a second plurality of tapered elements forming a second plurality of V-shaped areas interspaced between adjacent ones of said second plurality of tapered elements, each of said second plurality of tapered elements terminating in a flat surface of said second member; each of said V-shaped areas having its maximum dimension at said flat surface, the flat portions of each of said tapered elements being less in width than the maximum width of each of said V-shaped areas, first means connected to said first and second members maintaining said flat surfaces in spaced parallel relationship such that each of the flat portions of each of said tapered elements is directly opposite one of said V-shaped areas, second means communicating with each of said V-shaped areas drawing fluid at constant pressure therethrough in a direction from the widest dimension to the smallest dimension of said V-shaped areas whereby a slack length of tape inserted between said first and second members is caused to deform into loops of equal length within each of said V-shaped areas.

References Cited by the Examiner

UNITED STATES PATENTS

| | | | |
|---|---|---|---|
| 1,025,739 | 5/1912 | Davis | 269—272 |
| 3,112,473 | 11/1963 | Wickland et al. | 226—97 X |

OTHER REFERENCES

German printed application, 1,170,691, May 1964.

M. HENSON WOOD, JR., *Primary Examiner.*

A. N. KNOWLES, *Assistant Examiner.*